United States Patent
Wimbert et al.

(10) Patent No.: US 8,876,342 B2
(45) Date of Patent: Nov. 4, 2014

(54) ADAPTIVE VEHICLE CABIN LIGHT

(75) Inventors: Frank Wimbert, Owen (DE); Philip Hupfer, Esslingen (DE)

(73) Assignee: Flextronics AP, LLC, Broomfield, CO (US)

(*) Notice: Subject to any disclaimer, the term of this patent is extended or adjusted under 35 U.S.C. 154(b) by 176 days.

(21) Appl. No.: 13/484,723

(22) Filed: May 31, 2012

(65) Prior Publication Data
US 2012/0307509 A1     Dec. 6, 2012

(51) Int. Cl.
*B60Q 3/00*     (2006.01)
*B60Q 3/02*     (2006.01)
*B60N 2/02*     (2006.01)

(52) U.S. Cl.
CPC ............ *B60Q 3/0286* (2013.01); *B60Q 3/0293* (2013.01); *B60N 2/0232* (2013.01)
USPC ............ 362/488; 362/464; 362/471; 362/487

(58) Field of Classification Search
CPC ............................. B60Q 3/0253; B60Q 3/0286
USPC .................................. 362/464, 471, 487, 488
See application file for complete search history.

(56) References Cited

U.S. PATENT DOCUMENTS

| | | | | |
|---|---|---|---|---|
| 7,641,370 B2* | 1/2010 | Heine et al. | ................... | 362/471 |
| 8,055,023 B2* | 11/2011 | Goto et al. | ................... | 382/104 |
| 2006/0261970 A1* | 11/2006 | Colacecchi | ............... | 340/686.1 |
| 2008/0205075 A1* | 8/2008 | Hikmet et al. | ............... | 362/488 |

* cited by examiner

*Primary Examiner* — Stephen F Husar
*Assistant Examiner* — James Cranson, Jr.
(74) *Attorney, Agent, or Firm* — Haverstock & Owens LLP

(57) ABSTRACT

Embodiments of the present invention are directed to an adaptable vehicle cabin light, with which in all seating positions of a vehicle seat, reading conditions are optimal. The vehicle seat is adjustable. Each position of the vehicle seat has a corresponding reading area. The vehicle cabin light includes one or more light sources that align with the different reading areas. As the vehicle seat moves, the illumination moves with it. In some embodiments, the one or more light sources are controlled by a control unit which selectively turns on a group of the one or more light sources to illuminate the corresponding reading area of the position of the vehicle seat. In some embodiments, the one or more light sources are enclosed in an adjustable optics, wherein movements of the adjustable optics are controlled by the control unit.

20 Claims, 4 Drawing Sheets

ADAPTIVE VEHICLE CABIN LIGHT

RELATED APPLICATIONS

This application claims benefit of priority of the co-pending German Application No. DE 10 2011 076 777.0 filed May 31, 2011, entitled "Adaptive Fahrzeugdach-Innenleuchte," which is hereby incorporated by reference in its entirety.

FIELD OF THE INVENTION

The present invention is related to the field of vehicle cabin lights. More specifically, the present invention relates to an adaptive vehicle cabin light for illuminating a reading area associated with a position of an adjustable vehicle seat.

BACKGROUND OF THE INVENTION

A vehicle cabin light of the prior art has a fixed light source that illuminates a defined reading area for a vehicle seat. Reading conditions are based on the position of the vehicle seat relative to the defined reading area. As such, reading conditions inevitably deteriorate as the vehicle seat is away from the predetermined reading area.

FIGS. 1A-1B illustrate a vehicle cabin light 101 in the prior art. The vehicle cabin light 101 provides illumination for one or more adjustable vehicle seats 102 of a vehicle. The vehicle cabin light 101 includes, for each side of the vehicle, a fixed light source 104 that illuminates a defined reading area 103. The vehicle cabin light 101 emits a cone of light 105 to illuminate the defined reading area 103 regardless of the position of the adjustable seat 102.

In FIG. 1A, the vehicle seat 102 shown in solid line is in a normal position. The vehicle seat 102 shown in dotted line to the left of the normal position is in a front position. The vehicle seat 102 shown in dotted line to the right of the normal position is in a back position. The beam of light emitted by the light source 104 is fixed since the light source 104 within the vehicle cabin light 101 is fixed. The light source 104 is typically angled for the vehicle seat 102 in the normal position. Reading conditions are only ideal when the vehicle seat 102 is in the normal position. For other seating positions, such as the front position and the back position and other positions in between, the reading conditions are thus not optimal.

In FIG. 1B, the vehicle cabin light 101 includes a driver-side switch 106a to turn on/off the driver-side light source 104a that illuminates the driver-side reading area, a passenger-side switch 106b to turn on/off the passenger-side light source 104b that illuminates the passenger-side reading area, and a central switch 106c to turn on/off an ambient light source (not shown) that is integrated with the vehicle cabin light 101.

The present invention addresses at least these limitations in the prior art.

SUMMARY OF THE INVENTION

Embodiments of the present invention are directed to an adaptable vehicle cabin light, with which in all seating positions of a vehicle seat, reading conditions are optimal. The vehicle seat is adjustable. Each position of the vehicle seat has a corresponding reading area. The vehicle cabin light includes one or more light sources that align with the different reading areas. As the vehicle seat moves, the illumination moves with it. In some embodiments, the one or more light sources are controlled by a control unit which selectively turns on a group of the one or more light sources to illuminate the corresponding reading area of the position of the vehicle seat. In some embodiments, the one or more light sources are enclosed in an adjustable optics, wherein movements of the adjustable optics are controlled by the control unit.

In one aspect, a vehicle cabin light is for illuminating reading areas of a vehicle seat. In some embodiments, the vehicle seat is length adjustable, height adjustable or both. The vehicle cabin light includes one or more light sources, and a control device. The control device is configured to receive an instantaneous position of the vehicle seat as an input variable, and to control the one or more light sources based on the input variable such that reading conditions are optimal.

In some embodiments, the control device is configured to selectively turn on and off the light sources such that a reading area associated with the position of the vehicle seat is illuminated. Alternatively, the one or more light sources are enclosed in an adjustable optics, and the control device is configured to move the adjustable optics such that a reading area associated with the position of the vehicle seat is illuminated.

In some embodiments, the control device is configured to store information regarding groupings of light sources for seat positions that align with different reading areas. In some embodiments, the control device is configured to access information regarding groupings of light sources for seat positions that align with different reading areas.

In some embodiments, the one or more light sources are LEDs.

In another aspect, a system is for illuminating reading areas. The system includes an adjustable vehicle seat. In some embodiments, the vehicle seat is length adjustable, height adjustable or both. Each position of the vehicle seat typically has a corresponding reading area. The system also includes one or more light sources configured to align with each reading area, and a control device. The control device is configured to control the one or more light sources based on a position of vehicle seat such that illumination of the one or more light sources align with the corresponding reading area. In some embodiments, the control device is configured to instantaneously receive the position of the vehicle seat.

In some embodiments, the one or more light sources are housed within an adjustable optics, which can be pivotally mounted to a vehicle cabin light.

In some embodiments, the system also includes a dedicated sensor configured to specifically provide position of the vehicle seat to the control device.

In yet another aspect, a method of illuminating reading areas is provided. The method includes receiving an input variable regarding a position of a vehicle seat, and based on the input variable, controlling one or more light sources such that a reading area associated with the position of the vehicle seat is illuminated. In some embodiments, the reading conditions for the reading area are optimal.

In some embodiments, the input variable is received from a dedicated sensor configured to specifically provide the position of the vehicle seat.

In some embodiments, controlling one or more light sources includes activating a portion of the one or more light sources. Alternatively, controlling one or more light sources includes moving an adjustable optics housing the one or more light sources.

In some embodiments, the method further includes, prior to receiving an input variable, adjusting the vehicle seat at least one of up/down and front/back. In some embodiments, the method further includes accessing information regarding groupings of light sources for seat positions that align with different reading areas.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Embodiments of the present invention are directed to an adaptable vehicle cabin light, with which in all seating positions of a vehicle seat, reading conditions are optimal. The vehicle seat is adjustable. Each position of the vehicle seat has a corresponding reading area. The vehicle cabin light includes one or more light sources that align with the different reading areas. As the vehicle seat moves, the illumination moves with it. In some embodiments, the one or more light sources are controlled by a control unit which selectively turns on a group of the one or more light sources to illuminate the corresponding reading area of the position of the vehicle seat. In some embodiments, the one or more light sources are enclosed in an adjustable optics, wherein movements of the adjustable optics are controlled by the control unit.

Figure 2A:
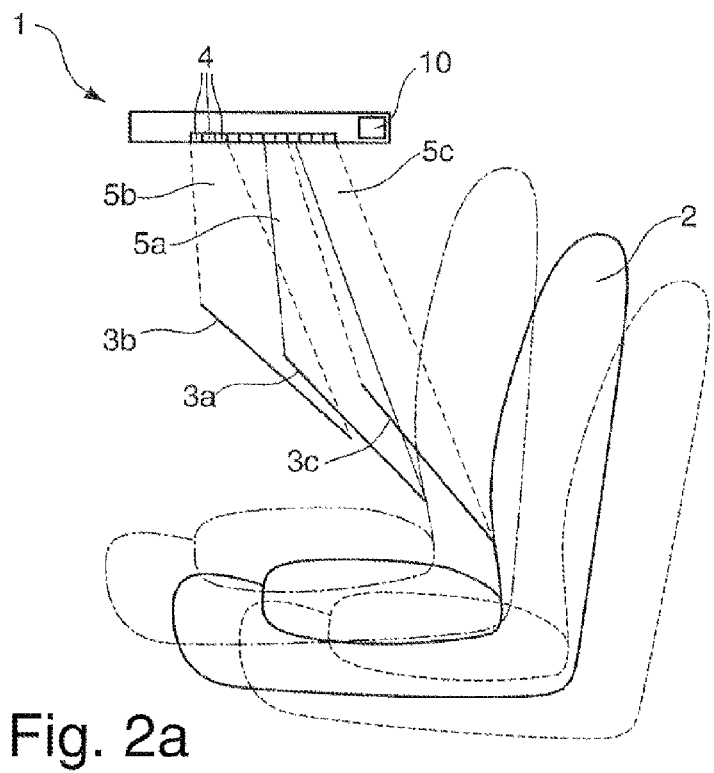
FIGS. 2A-2B illustrates an adaptive vehicle cabin light in accordance with the present invention.
Figure 2B:
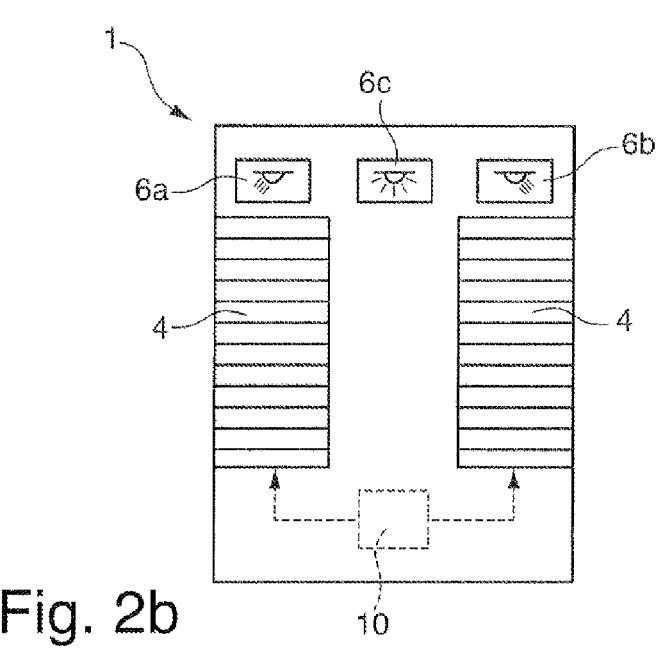

FIGS. 2A-2B illustrate an adaptive vehicle cabin light in accordance with the present invention. The adaptive vehicle cabin light 1 provides illumination for one or more adjustable vehicle seats 2 of a vehicle. The adaptive vehicle cabin light 1 includes, for each side of the vehicle, an array of light sources 4 configured to illuminate numerous reading areas of different positions of a vehicle seat 2.

Figure 1A:
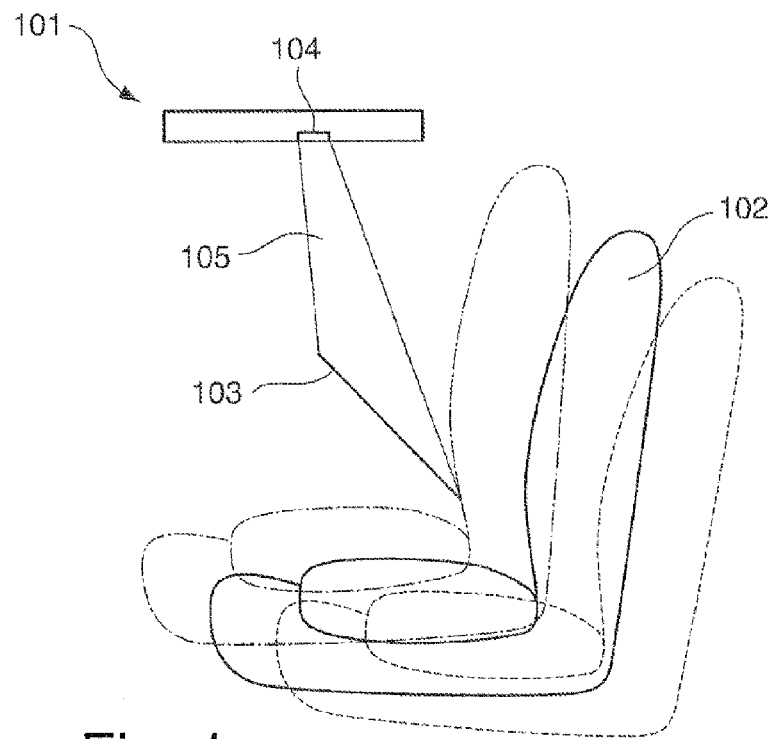
FIGS. 1A-1B illustrate a vehicle cabin light in the prior art.
Figure 1B:
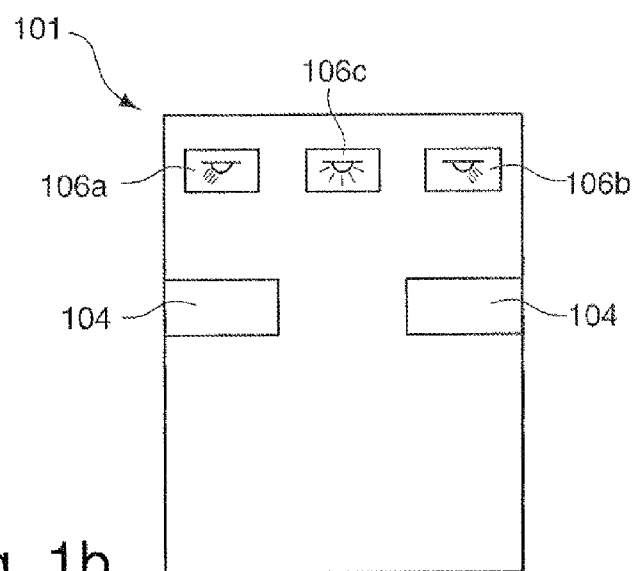

In some embodiments, the vehicle cabin light 1 is positioned above the vehicle seat 2. The vehicle seat 2 can be adjusted horizontally, vertically or both, and can be in numerous positions. For example, in FIG. 1A, the vehicle seat 2 shown in solid line is in a normal position. The vehicle seat 2 shown in dotted line to the left of the normal position is in a front position. The vehicle seat 2 shown in dotted line to the right of the normal position is in a back position. More or less positions are possible. Each position (e.g., the normal position, the front position and the back position) of the vehicle seat 2 is associated with a different reading area 3a, 3b, 3c. In some embodiments, the array of light sources 4 includes LEDs. The array of light sources 4 emits cones of light 5a, 5b, 5c. Each cone of light 5a, 5b, 5c is associated with a different position of the vehicle seat 2. In FIGS. 2A-2B, the array of light sources 4 includes 12 light sources. A first group of light sources includes a second set of four consecutive light sources and emits cone of light 5a. A second group of light sources includes a first set of four consecutive light sources and emits cone of light 5b. A third group of light sources includes a third set of four consecutive light sources and emits cone of light 5c. It should be appreciated that more or less light sources are possible, that more or less groups are possible, and that the light sources can be grouped differently. The adaptive vehicle cabin light 1 emits one of the cones of light 5a, 5b, 5c to illuminate a corresponding reading area 3a, 3b, 3c of the position of the adjustable seat.

In some embodiments, the adaptive vehicle cabin light 1 has a control device 10, such as a microprocessor, configured to control the array of light sources 4. The specific cone of light 5a, 5b, 5c emitted is dependent on the position of the vehicle seat 2. Each position of the vehicle seat 2 is associated with one of the reading areas 3a, 3b, 3c. Continuing with the example, if the vehicle seat 2 is in the normal position, then the first group of light sources emits the cone of light 5a for the reading area 3a.

The current seat position is typically supplied to the control device 10 as an input variable either by a dedicated sensor (not shown) or other vehicle electronics that provide the current seat position for other purposes, such as for air bag deployment purposes. Information regarding the groupings of light sources 4 for the seat positions that align with the different reading areas 3a, 3b, 3c are stored in the control device 10 or elsewhere that is accessible by the control device 10. Based on this lookup, the control device 10 controls the array of light sources 4.

Activation of each of the light sources 4 is dependent on the current position of the vehicle seat and is automatic. The control device 10 selectively activates the light sources 4 for illuminating one of the associated reading areas 3a, 3b, 3c. For example, for illuminating the normal position, which is associated with the reading area 3a, the control device 10 switches the first group of light sources on to provide the cone of light 5a, while the other groups of lights are turned off or dimmed. For another example, for illuminating the front position, which is associated with the reading area 3b, the control device 10 switches the second group of light sources on to provide the cone of light 5b, while the other groups of lights are turned off or dimmed. For yet another example, for illuminating the back position, which is associated with the reading area 3c, the control device 10 switches the third group of light sources on to provide the cone of light 5c, while the other groups of lights are turned off or dimmed. As such, the same optimal reading conditions advantageously apply to all seating positions.

In FIG. 2B, the vehicle cabin light 1 includes a driver-side switch 6a to turn on/off the driver-side light source 4a that illuminates the driver-side reading areas, a passenger-side switch 6b to turn on/off the passenger-side light source 4b that illuminates the passenger-side reading areas, and a central switch 6c to turn on/off an ambient light source (not shown) that is integrated with the vehicle cabin light 1.

Figure 3:
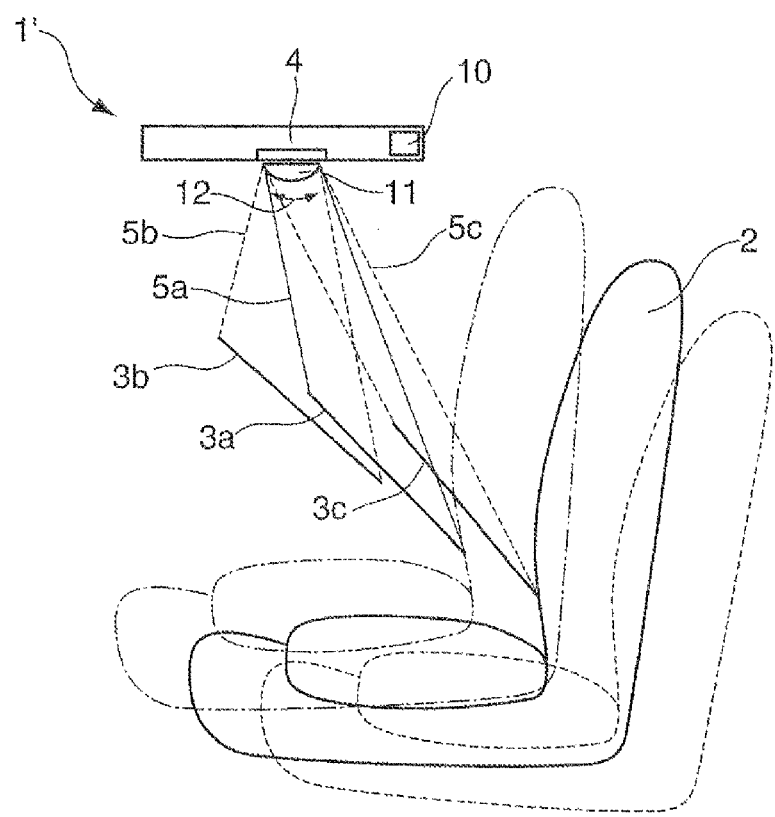
FIG. 3 illustrate another adaptive vehicle cabin light in accordance with the present invention.

FIG. 3 illustrates another adaptive vehicle cabin light in accordance with the present invention. The vehicle cabin light 1' includes one or more light sources 4 within an adjustable optics 11. The control unit 10 automatically adjusts optics 11 based on the position of the vehicle seat 2 to provide illumination to one of the reading areas 3a, 3b, 3c. The adjustable optics 11 can be formed by a reflecting mirror or a lens, which is pivotally mounted to the vehicle cabin light 1'. In some embodiments, the vehicle cabin light 1' is positioned above the vehicle seat 2. The adjustable optics 11 automatically moves in a direction 12 according to the current position of the vehicle seat 2 to illuminate the respective reading areas 3a, 3b, 3c.

Figure 4:
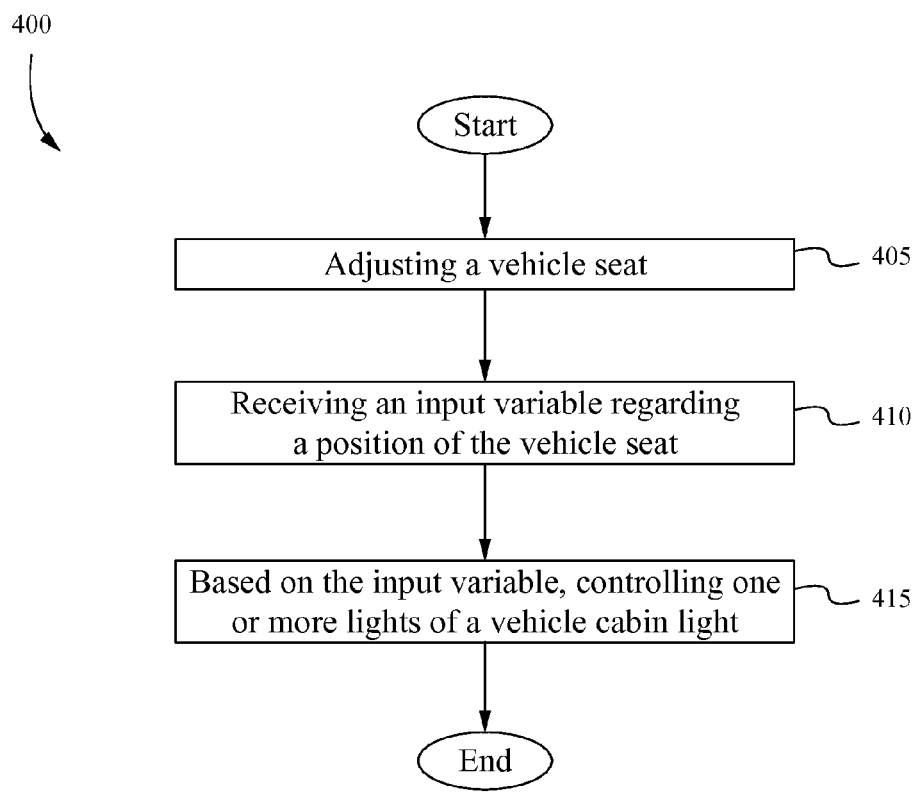
FIG. 4 illustrates a method of illuminating reading areas in accordance with the present invention.

FIG. 4 illustrates a method of illuminating reading areas in accordance with the present invention. The method 400 begins at a step 405, wherein a vehicle seat is adjusted. For example, the vehicle seat can be adjusted up/down and left/right. After the vehicle seat is adjusted, at a step 410, an input variable regarding the position of the vehicle seat is received. In some embodiments, the input variable is received upon activation of an on/off switch. At a step 415, based on the input variable, one or more lights of a vehicle cabin light are controlled such that a reading area associated with the position of the vehicle seat is illuminated. After the step 415, the method ends.

In some embodiments, the control device includes information regarding groupings of light sources for seat positions that align with different reading areas. Alternatively, this information is stored elsewhere that is accessible by the control device.

In some embodiments, the information is preprogrammed by a manufacturer. Alternatively or in addition to, the information can be programmed by a user.

In some embodiments, each of the one or more lights is selectively activated by the control device. Alternatively, the one or more lights are enclosed by an adjustable optics which tracked by the control device.

A vehicle cab light of the present invention automatically and adaptively illuminates a reading area corresponding to a position of a vehicle seat. The vehicle cab light includes at least one light source and control means. Depending on the position of the vehicle seat, at least one of the at least one light source is automatically activated to radiate light towards the reading area corresponding to the position of the vehicle seat. Power loss and power density are advantageously reduced because such targeted luminance improves the illumination of the interior light.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A vehicle cabin light for illuminating reading areas of a vehicle seat, the vehicle cabin light comprising:
    a. one or more light sources; and
    b. a control device configured to receive an instantaneous position of the vehicle seat as an input variable, and to control the one or more light sources based on the input variable such that reading conditions are optimal, wherein the input variable comprises a horizontal movement of the vehicle seat.

2. The vehicle cabin light of claim 1, wherein the control device is configured to selectively turn on and off the light sources such that a reading area associated with the position of the vehicle seat is illuminated.

3. The vehicle cabin light of claim 1, wherein the one or more light sources are enclosed in an adjustable optics.

4. The vehicle cabin light of claim 3, wherein the control device is configured to move the adjustable optics such that a reading area associated with the position of the vehicle seat is illuminated.

5. The vehicle cabin light of claim 1, wherein the control device is configured to store information regarding groupings of light sources for seat positions that align with different reading areas.

6. The vehicle cabin light of claim 1, wherein the control device is configured to access information regarding groupings of light sources for seat positions that align with different reading areas.

7. The vehicle cabin light of claim 1, wherein the one or more light sources are LEDs.

8. A system for illuminating reading areas, the system comprising:
    a. an adjustable vehicle seat, wherein each position of the vehicle seat has a corresponding reading area;
    b. one or more light sources configured to align with each reading area; and
    c. a control device configured to control the one or more light sources based on a position of vehicle seat such that illumination of the one or more light sources align with the corresponding reading area, wherein the position of the vehicle seat comprises a horizontal movement.

9. The system of claim 8, wherein the vehicle seat is at least one of length adjustable and height adjustable.

10. The system of claim 8, wherein the control device is configured to instantaneously receive the position of the vehicle seat.

11. The system of claim 8, wherein the one or more light sources are housed within an adjustable optics.

12. The system of claim 11, wherein the adjustable optics is pivotally mounted to a vehicle cabin light.

13. The system of claim 8, further comprising a dedicated sensor configured to specifically provide position of the vehicle seat to the control device.

14. The method of illuminating reading areas, the method comprising:
    a. receiving an input variable regarding a position of a vehicle seat; and
    b. based on the input variable, controlling one or more light sources such that a reading area associated with the position of the vehicle seat is illuminated, wherein the input variable comprises a horizontal movement of the vehicle seat.

15. The method of claim 14, wherein the input variable is received from a dedicated sensor configured to specifically provide the position of the vehicle seat.

16. The method of claim 14, wherein reading conditions for the reading area are optimal.

17. The method of claim 14, wherein controlling one or more light sources includes activating a portion of the one or more light sources.

18. The method of claim 14, wherein controlling one or more light sources includes moving an adjustable optics housing the one or more light sources.

19. The method of claim 14, further comprising, prior to receiving an input variable, adjusting the vehicle seat at least one of up/down and front/back.

20. The method of claim 14, further comprising accessing information regarding groupings of light sources for seat positions that align with different reading areas.

* * * * *